United States Patent [19]

Sikula

[11] Patent Number: 4,592,122

[45] Date of Patent: Jun. 3, 1986

[54] HAND APPLICATOR FOR RADIALLY ASSEMBLED SPRING RETAINING RINGS

[75] Inventor: John Sikula, Astoria, N.Y.

[73] Assignee: Waldes Truarc, Inc., Long Island City, N.Y.

[21] Appl. No.: 748,455

[22] Filed: Jun. 25, 1985

[51] Int. Cl.[4] .............................................. B23P 19/04

[52] U.S. Cl. ...................................................... 29/229

[58] Field of Search .................................. 29/225, 229

[56] References Cited

U.S. PATENT DOCUMENTS

| | | | |
|---|---|---|---|
| 2,978,802 | 4/1961 | Erdmann | 29/229 |
| 3,595,123 | 7/1971 | Wurzel | 29/229 |
| 3,681,839 | 8/1972 | Janecka | 29/229 |
| 4,550,485 | 11/1985 | Killian | 29/229 |

*Primary Examiner*—James L. Jones, Jr.
*Attorney, Agent, or Firm*—Burns, Doane, Swecker & Mathis

[57] ABSTRACT

An applicator for installing a retaining ring into an external groove of a workpiece comprises a floor having a slot for receiving a grooved workpiece. A pair of groove locators are rotatably mounted alongside the floor. The groove locators have forwardly converging side edges against which the rings engage as they are being pushed forwardly. Such engagement pushes the locators apart whereby forward free ends of the locators are displaced out of the workpiece groove by an advancing ring. The side edges are arranged to impose relatively small forces tending to close the ring, and to retain the ring in contact with the floor.

15 Claims, 5 Drawing Figures

Fig. 2
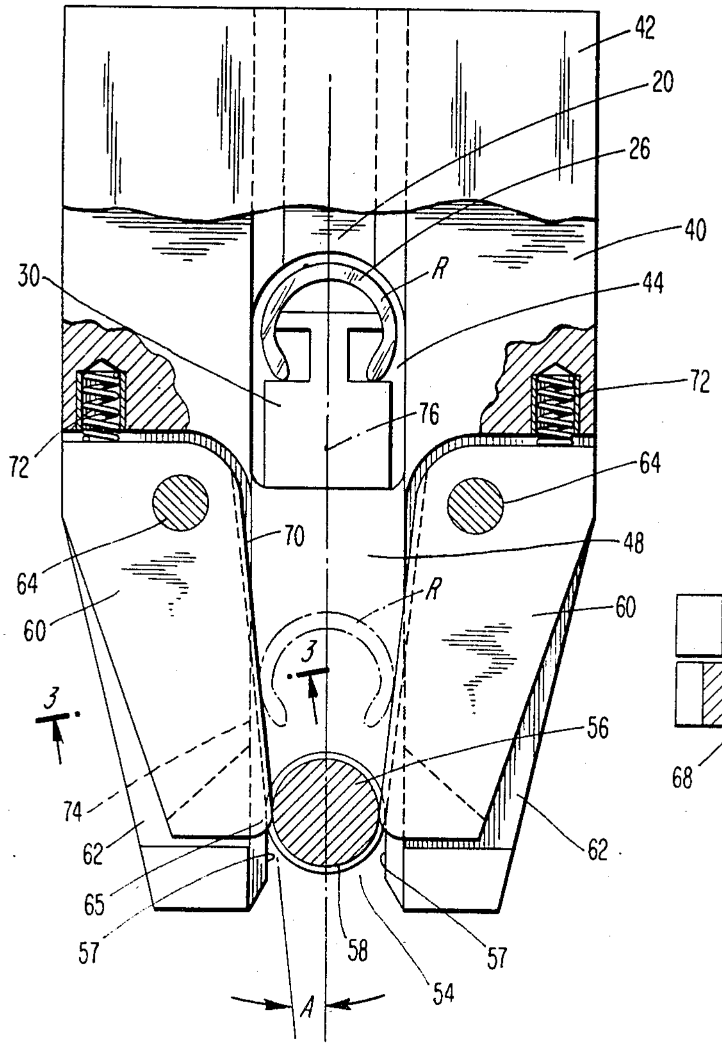
Fig. 3
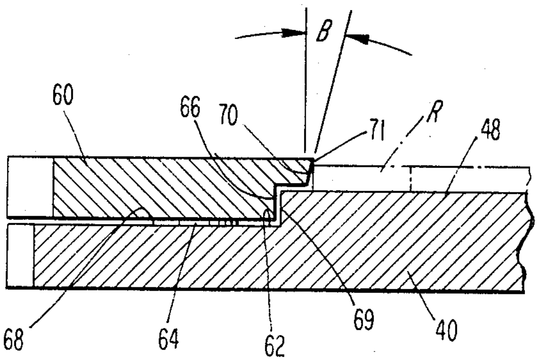
Fig. 4
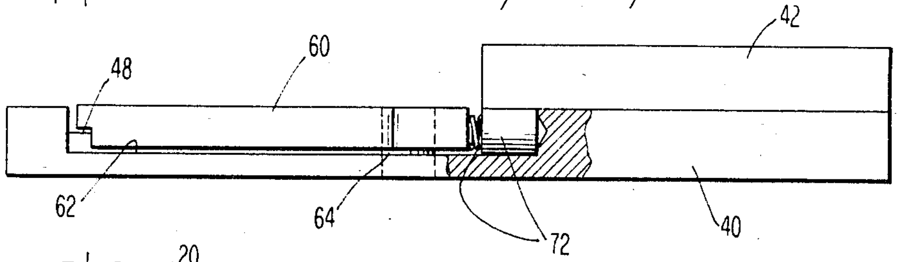
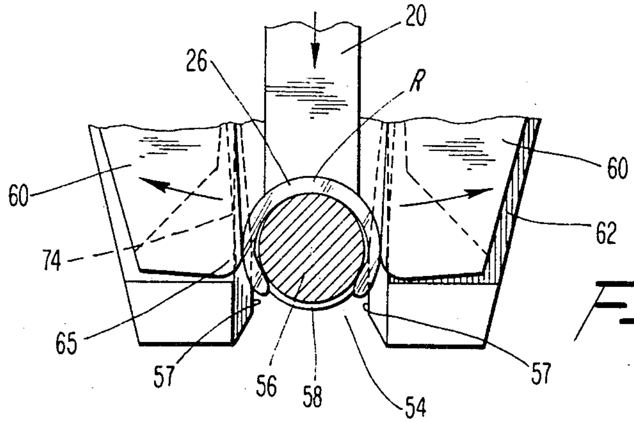
Fig. 5

HAND APPLICATOR FOR RADIALLY ASSEMBLED SPRING RETAINING RINGS

RELATED INVENTION

This invention is related to the subject matter of copending, commonly assigned U.S. Applications Ser. No. 06/579,559 filed on Feb. 13, 1984 by Edmund F. Killian, now U.S. Pat. No. 4,550,485, and Ser. No. 748,426 filed on June 25, 1985 by Gabor Ban.

BACKGROUND AND OBJECTS OF THE INVENTION

The present invention relates to hand applicators for installing radially assembled spring retaining rings and, in particular, for installing radially assembled spring retaining rings into external grooves of workpieces.

Radially assembled spring retaining rings, such as the type disclosed in Wurzel U.S. Pat. No. 3,595,123 issued July 27, 1971, have long been employed as stop or limiting elements on machined parts. Retaining rings of this type are installed in external grooves formed in the parts. Externally applied retaining rings are installed in external grooves by pushing the open side of the ring against the groove, causing the ring ends to separate. When the thus-expanded ring has fully entered the groove, the ring ends snap-back to secure the ring in place.

In order to facilitate the installation of radially applied rings, it has been proposed to employ a hand applicator which forcefully inserts a ring into a groove of a machine part. Hand-held applicators have been proposed, for example, in Erdman U.S. Pat. No. 2,978,802 issued Apr. 11, 1961 and Janecka U.S. Pat. No. 3,681,839 issued Aug. 8, 1972.

In addition, the assignee of the present invention has heretofore marketed an applicator which comprises a hand-held housing on which is mounted a magazine and a nose assembly. The nose assembly contains a ramp along which retaining rings can be pushed, and a forwardly open slot for receiving a workpiece such as a shaft, the width of the slot being equal to the diameter of the shaft. The magazine feeds retaining rings to the ramp one-at-a-time. The housing carries a pusher and a fluid-driven mechanism for reciprocating the pusher when the user activates a trigger on the housing. When the pusher travels forwardly, it pushes a retaining ring into a groove on the workpiece. It can occur, however, that the groove is not properly aligned with the ramp, whereupon the ring can be installed in a skewed condition, i.e., partly in the groove and partly out of the groove. Such an improper installation, if not detected, may lead to failure. Even if the improper installation is detected, correction thereof is inconvenient and time-consuming on an assembly line where delays are not easily tolerated.

In the above-mentioned Janecka and Erdman patents, a groove locator finger is provided such that the locator finger passes through the workpiece groove as the workpiece is being received in a slot of the applicator. This is intended to align the groove with a retaining ring located in the slot. Thus, as the applicator continues to be advanced relative to the workpiece, the locator finger moves out of the groove and thereafter the retaining ring is pushed into the vacated groove. The locator finger of the Erdman patent is made yieldable so as to be able to yield outwardly when the shaft and installed ring are removed from the slot (see FIGS. 8-11 of the Erdman patent).

In order for the applicators of the above-described type to function acceptably, the manipulation of the applicators must be performed in such a manner that the groove and retaining ring do not become misaligned during the instant after the locator finger leaves the groove and before the retaining ring enters the groove. Otherwise, the ring could become installed in a skewed fashion.

In commonly assigned copending Application Ser. No. 06/579,559 of Edmund F. Killian filed Feb. 13, 1984, a hand applicator is disclosed in which one or more pivotably mounted locators are provided near the end of the ramp. The locator is spring-biased toward the slot in the ramp so as to be receivable in the workpiece groove. A cam face is disposed on a rear side of each locator forwardly of the pivot axis and is adapted to be engaged by a ring as the ring is being pushed by the pusher. As a result, the ring cams the locators outwardly as the ring enters the workpiece. The disclosure of that application is incorporated herein by reference. Such an arrangement provides a highly effective and dependable means of accurately inserting a retaining ring into a workpiece groove. However, room for improvement remains. In that regard, it will be appreciated that as the legs of the ring apply laterally outward forces against the cam faces of the locators, the resulting reaction forces acting against the ring legs will tend to close the ring, i.e., to force the legs of the ring together. This closing action makes it more difficult to install the ring in the workpiece groove. Thus, it would be desirable to minimize the forces tending to close the ring.

Furthermore, it may occur that the forces acting upon the ring cause the ring to be slightly raised off the ramp floor as the ring approaches the workpiece groove. If the thickness of the ring has been designed to closely match the thickness of the workpiece groove, such raising of the ring may produce sufficient misalignment between the ring and groove (e.g., the plane of the ring becomes slightly skewed relative to the plane of the groove) to prevent the ring from entering the groove. Therefore, it could be desirable to prevent such misalignment.

It is, therefore, an object of the present invention to minimize or obviate problems of the type discussed above.

Another object is to provide a novel applicator for installing retaining rings into external grooves of workpieces.

A further object is to provide such an applicator which includes locators for automatically locating the applicator relative to the workpiece groove, wherein the tendency for the locators to compress or close the spring is minimized.

An additional object is to assure that the rings are held against the floor of the ramp as they approach the workpiece groove, in order to minimize any tendency for the rings to become misaligned relative to the groove.

SUMMARY OF THE INVENTION

These objects are achieved by the present invention which involves an applicator for installing a radially assembled spring retaining ring into an external groove of a workpiece. The applicator comprises a base plate forming a fore-aft extending floor along which a retaining ring may travel. The floor has a forwardly open slot for receiving a grooved workpiece. A pair of groove locators are mounted on the base plate on opposite sides of a fore-aft axis of the floor for movement toward and away from one another. Each locator comprises a side edge extending in a generally forward direction and positioned to be contacted by a forwardly traveling ring, and a locator tip disposed at a forward end of the locator and arranged to enter a groove of a workpiece situated in the slot. The side edges of the locators converge forwardly in a rest condition such that an imaginary point at which forward projections of the edges intersect is disposed forwardly of the base plate. The point at which the spacing between those edges corresponds in dimension to the ring width, occurs rearwardly of the slot such that the ring contacts the edges before entering a workpiece groove. A spring yieldably biases the locators toward one another and is yeildable to allow the locators to be cammed apart by a forwardly advancing ring which contacts the edges. A pusher pushes a retaining ring forwardly toward the slot and into camming relationship with the edges.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 2 is a cross-sectional view taken along the line 2—2 in FIG. 1, depicting in phantom a workpiece disposed in a slot of the applicator, with the locators projecting into a groove of the workpiece;

FIG. 3 is a cross-sectional view taken along line 3—3 of FIG. 2;

FIG. 4 is a side elevational view of the nose part of the appilcator, with a portion thereof broken away to expose a spring;

FIG. 5 is a top view of the forward end of the nose piece as a ring is being installed into a workpiece groove.

DETAILED DESCRIPTION OF PREFERRED EMBODIMENTS OF THE INVENTION

Figure 1:
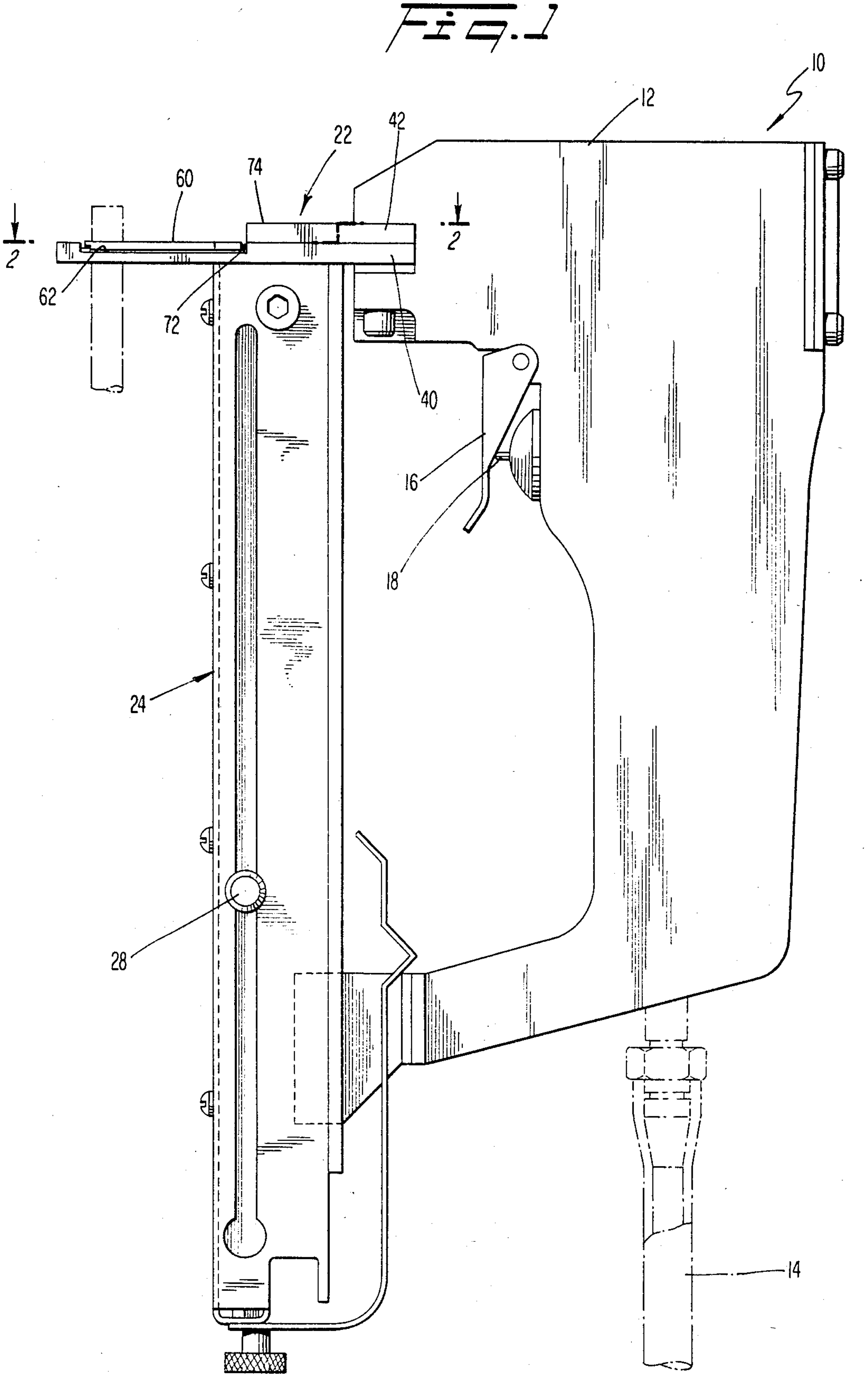
FIG. 1 is a side elevational view of an applicator for installing retaining rings according to the present invention, with a workpiece being depicted in phantom lines.

An applicator 10 for installing retaining rings is depicted in FIG. 1. The applicator comprises a hand-held gun or housing 12 which contains a fluid-driven mechanism of a conventional type. The mechanism is driven by fluid, preferably air, delivered through an inlet hose 14. A manual trigger 16 is connected to the housing for depressing an actuator pin 18. The pin 18, when depressed, activates the mechanism to reciprocate a pusher slide 20 (FIG. 2). A gun of the above-described type is conventional and is marketed by the Duo-Fast Corp. of Franklin Park, Ill.

Mounted on the housing are a nose assembly 22 and a magazine, the latter carrying a stack of retaining rings 26 (FIG. 2). The magazine includes a spring-biased arm 28 which underlies the stack of retaining rings and urges the stack upwardly into the nose assembly 22. The retaining rings R are slidably mounted upon a rail 30 (FIG. 2) disposed within the magazine. The rail terminates at the nose assembly so that the uppermost ring can be "picked-off" the stack by the pusher 20.

The nose assembly 22 comprises a base plate 40, and a cover plate 42 overlying the base plate 40 and connected thereto by suitable fasteners. An opening 44 in the base plate 40 communicates with the magazine and is aligned with the rail 30, such that the uppermost ring 26 in the stack of rings is pushed through the opening 44 and against the top plate 42 and is retained in that position, as depicted in FIG. 2.

The base plate includes a floor 48 along which a picked-off retaining ring R is pushed by the pusher 20. The floor 48 terminates at its forward end in the form of a slot 54 which is sized to receive a workpiece or machine part, such as a shaft 56 which includes a groove 58 in which a retaining ring R is to be installed. The outer diameter of the groove 58 substantially equals the width of the slot 54, whereby the workpiece 56, when disposed within the slot 54 is retained against skewing by means of two opposing side faces 57 of the slot. The width of the groove 58, i.e., its dimension parallel to the shaft axis, corresponds to the thickness of the ring R.

In accordance with the present invention, at least one, but preferably two, groove locators 60 are mounted on the nose assembly adjacent a forward end thereof. Recesses 62 are formed in the lower plate 40 to receive the locators 60. Each locator is pivotably mounted to the lower plate adjacent a rear end of the reces by means of a pivot pin 64. The forward free ends or tips 65 of the locators 60 are thus able to swing toward and away from the slot /54. Those forward free ends are undercut to form upstanding surfaces 66 which bear against upstanding walls 69 of the grooves 62. The free ends 65 slide upon the floor 48 which is elevated with respect to the lower surfaces 68 of the grooves 62, as is evident from FIG. 3.

Each locator 60 includes an upstanding edge 70 (FIG. 3) against which the retaining ring R slides as it is pushed by the pusher 20. The edges 70 are arranged so as to be convergent in the forward direction when the locators 60 are in a rest condition (FIG. 2). In that rest condition, the locators are biased toward one another by coil compression springs 72 mounted in sockets in the lower plate 40. The springs 72 bias the locators such that the upstanding surfaces 66 of the locators rest against the walls 69 of the grooves 62. Other types of spring arrangements can be employed in lieu of the coil springs, e.g., leaf springs.

The converging relationship of the edges 70 is such that an imaginary point where forward projections of the edges 70 intersect is located forwardly of the base plate. Thus, the angle A formed between each edge 70 and the fore-aft axis 76 is relatively small. Furthermore, the point at which the spacing between the edges 70 corresponds in dimension to the ring width is located rearwardly of the slot, whereby the ring will contact the edges prior to entering the workpiece groove, as indicated in phantom lines in FIG. 2. Preferably, each edge 70 forms an acute angle A of between 5° and 12° with the fore-aft axis 76 of the floor (FIG. 2).

The edges 70 define rearwardly facing cam surfaces which enable the ring R to push the locators away from one another. The free ends 65 will then leave the workpiece groove 58 as the ring enters the groove 58.

It will be appreciated that the relatively small angle A formed between the edges and the fore-aft axis 76 minimizes the size of the reaction forces applied against the ring legs as compared, for example, with the forces which will occur in the afore-mentioned U.S. Application Ser. No. 06/579,559. Accordingly, the ring will be subjected to smaller forces tending to close the ring, and it will be easier to install the ring in the workpiece groove.

Each of the edges is oriented non-perpendicularly relative to the floor 48, i.e., the edge 70 forms an acute angle B (FIG. 3) with respect to the floor (FIG. 3). The height of the edge 70 is greater than the thickness of the ring R. Furthermore, the inclination of the edge 70 is such that an upper or outer portion 71 of the edge slightly overlies the ring R as is evident from FIG. 3. As a result, the ring is held against the floor 48 and cannot rise therefrom. Thus, it is assured that the ring will enter the workpiece groove, even when the groove thickness closely approximates the thickness of the ring, i.e., the ring and groove will be coplanar as the ring approaches the groove.

The angle B preferably lies in the range of from 5° to 25°.

In operation, the nose assembly 22 is oriented such that the slot 52 is aligned with the workpiece shaft 56. The slot is then pushed onto the workpiece 56. When the workpiece reaches the rear end of the slot, the tips 65 of the locators enter the groove 58 to assure that the pusher 20 is aligned with the groove 58. If the locators 60 are not aligned with the groove 58 when the slot is pushed onto the workpiece, the outer (non-grooved) surface of the workpiece 56 will cam the locators 60 apart. It is then merely necessary to move the nose assembly 22 along the direction of the workpiece axis until the tips 65 become aligned with the groove 58, whereupon the tips 65 snap into the groove 58 by the action of the springs 72.

The slot 52 is stable relative to the workpiece 56 since the width of the slot corresponds to the workpiece diameter. Thus, the workpiece axis will be constrained to lie substantially perpendicularly to the plane of the floor 48, i.e., the plane defined by the groove 58 will remain parallel with the plane of the floor 48.

The trigger 16 is then actuated to cause the pusher 20 to be displaced forwardly to push the uppermost retaining ring 26 forwardly. Prior to reaching the workpiece, the ring 26 will engage the side edges 70 of the locators 60 and begin spreading the locators apart, against the bias of springs 72. Due to the relatively small angle A, the compressive forces acting against the ring legs will be small. Hence, there will occur very little compression or closing of the ring, thereby facilitating installation of the ring into the groove 58.

The ring 26 will be held firmly against the floor 48 as the ring approaches the workpiece, due to the overlying portions 71 of the edges 70. As a result, perfect alignment of the ring with the groove 58 is assured.

The coil compression springs represent a highly durable and dependable means of imposing a spring bias upon the locators.

Although the present invention has been described in connection with preferred embodiments thereof, it will be appreciated by those skilled in the art that additions, modifications, substitutions and deletions may be made without departing from the spirit and scope of the invention as defined in the appended claims.

What is claimed is:

1. An applicator for installing a radially assembled spring retaining ring into an external groove of a workpiece, said applicator comprising:

a base plate forming a fore-aft extending floor along which a retaining ring may travel, said floor having a forwardly open slot for receiving a grooved workpiece, a pair of groove locators mounted on said base plate on opposite sides of a fore-aft axis of said floor for movement toward and away from one another, each locator comprising:

a side edge extending in a generally forward direction and positioned to be contacted by a forwardly traveling ring, and a locator tip disposed at a forward end of said locator and arranged to enter a groove of a workpiece situated in said slot, said side edges of said locators converging forwardly in a rest condition such that an imaginary point at which forward projections of said edges intersect is disposed forwardly of said base plate, the point at which the spacing between said edges corresponds in dimension to the ring width occurs rearwardly of said slot such that the ring contacts said edges before entering a workpiece groove, spring means for yieldably biasing said locators toward one another, said spring means being yieldable to allow said locators to be cammed apart by a forwardly advancing ring which contacts said edges, and pusher means for pushing a retaining ring forwardly toward said slot and into camming relationship with said edges.

2. An applicator according to claim 1, wherein said base plate includes a pair of recesses in which said locators are situated, said springs being disposed in said recesses.

3. An apparatus according to claim 2, wherein said spring means comprises a pair of coil compression springs.

4. An apparatus according to claim 3, wherein said edges each have a height greater than the thickness of the ring, said edge including an outer portion overlying a ring which is being forwardly pushed, to retain the ring against said floor.

5. An applicator according to claim 4, wherein said edges are inclined toward one another in an outward direction away from the plane of said floor.

6. An applicator according to claim 1, wherein said edges each form an angle of between 5° and 12° relative to said fore-aft axis.

7. An applicator according to claim 1, wherein each locator is mounted for pivotable movement about an axis oriented perpendicularly to the plane of said floor at a location rearwardly of said slot.

8. An applicator for installing a radially, assembled spring retaining ring into an external groove of a workpiece, said applicator comprising:

a base plate forming a fore-aft extending floor along which a retaining ring may travel, said floor having a forwardly open slot for receiving a grooved workpiece, a pair of groove locators mounted on said base plate on opposite sides of a fore-aft axis of said floor for movement toward and away from one another, each locator comprising:

a side edge extending in a generally forward direction and positioned to be contacted by a forwardly traveling ring, and a locator tip disposed at a forward end of said locator and arranged to enter a groove of a workpiece situated in said slot, said side edges of said locators converging forwardly in a rest condition such that the point at which the spacing between said edges correspondings to the ring width occurs rearwardly of said slot such that the ring contacts said edges before entering a workpiece groove, said side edges each having a height greater than the thickness of the ring, said edge including an outer portion which overlies a ring as the ring is being forwardly pushed, to retain the ring against said floor, spring means for yieldably biasing said locators toward one another, said spring means being yieldable to allow said locators to be cammed apart by a forwardly advancing ring which contacts said edges, and pusher means for pushing a retaining ring forwardly toward said slot and into camming relationship with said edges.

9. An applicator according to claim 8, wherein said base plate includes a pair of recesses in which said locators are situated, said springs being disposed in said recesses.

10. An apparatus according to claim 9, wherein said spring means comprises a pair of coil compression springs.

11. An applicator according to claim 8, wherein said edges are inclined toward one another in an outward direction away from the plane of said floor.

12. An applicator according to claim 8, wherein said edges each form an angle of between 5° and 12° relative to said fore-aft axis.

13. An applicator according to claim 8, wherein each locator is mounted for pivotable movement about an axis oriented perpendicularly to the plane of said floor at a location rearwardly of said slot.

14. In an applicator for installing a retaining ring into a groove in a workpiece, said applicator being of the type comprising a housing, a nose assembly mounted on said housing and including a base plate and a top plate overlying said base plate, said base plate forming a fore-aft extending floor along which a retaining ring may travel, said floor forming a forwardly open slot having a width corresponding to a non-grooved diameter of the workpiece, said base plate having an opening therein, magazine mounted on said housing and communicating with said opening, said magazine being adapted to carry a supply of spring retaining rings for introduction through said opening, and a motor-driven pusher carried by said housing and arranged for reciprocable movement to pick-off a retaining ring at said opening and push it forwardly toward the workpiece disposed in said slot, the improvement comprising:

a pair of groove locators mounted on said base plate on opposite sides of a fore-aft axis of said floor for movement toward and away from one another, each locator comprising a side edge extending in a generally forward direction and positioned to be contacted by a forwardly traveling ring, and a locator tip disposed at a forward end of said locator and arranged to enter a groove of a workpiece situated in said slot, said side edges of said locators converging forwardly in a rest condition such that an imaginary point at which forward projections of said edges intersect is disposed forwardly of said base plate, the point at which the spacing between said edges corresponds in dimension to the ring width occurs rearwardly of said slot such that the ring contacts said edges before entering a workpiece groove, spring means for yieldably biasing said locators toward one another, said spring means being yieldable to allow said locators to be cammed apart by a forwardly advancing ring which contacts said edges, and pusher means for pushing a retaining ring forwardly toward said slot and into camming relationship with said edges.

15. In an applicator for installing a retaining ring into a groove in a workpiece, said applicator being of the type comprising a housing, a nose assembly mounted on said housing and including a base plate and a top plate overlying said base plate, said base plate forming a fore-aft extending floor along which a retaining ring may travel, said floor forming a forwardly open slot having a width corresponding to a non-grooved diameter of the workpiece, said base plate having an opening therein, a magazine mounted on said housing and communicating with said opening, said magazine being adapted to carry a supply of spring retaining rings for introduction through said opening, and a motordriven pusher carried by said housing and arranged for reciprocable movement to pick-off a retaining ring at said opening and push it forwardly toward the workpiece disposed in said slot, the improvement comprising:

a pair of groove locators mounted on said base plate on opposite sides of a fore-aft axis of said floor for movement toward and away from one another, each locator comprising:

a side edge extending in a generally forward direction and positioned to be contacted by a forwardly traveling ring, and a locator tip disposed at a forward end of said locator and arranged to enter a groove of a workpiece situated in said slot, said side edges of said locators converging forwardly in a rest condition such that the point at which the spacing between said edges corresponding to the ring width occurs rearwardly of said slot such that the ring contacts said edges before entering a workpiece groove, said side edges each having a height greater than the thickness of the ring, said edge including an outer portion which overlies a ring as the ring is being forwardly pushed, to retain the ring against said floor, spring means for yieldably biasing said locators toward one another, said spring means being yieldable to allow said locators to be cammed apart by a forwardly advancing ring which contacts said edges, and pusher means for pushing a retaining ring forwardly toward said slot and into camming relationship with said edges.

* * * * *